United States Patent [19]

Ruzie et al.

[11] Patent Number: 4,744,438

[45] Date of Patent: May 17, 1988

[54] SEISMIC PROBE MORE PARTICULARLY USABLE IN AN UNTUBED DRILLING SHAFT

[75] Inventors: Gérard Ruzie, Dourdan; Jean Batot, Arpajon; Jean-Louis Marchand, St. Vrain, all of France

[73] Assignee: Commissariat a l'Energie Atomique, Paris, France

[21] Appl. No.: 941,835

[22] Filed: Dec. 15, 1986

[30] Foreign Application Priority Data

Dec. 16, 1985 [FR] France .................. 85 18613

[51] Int. Cl.⁴ .......................................... G01V 1/40
[52] U.S. Cl. .................................. 181/102; 367/911; 166/66; 166/212
[58] Field of Search ............... 181/102, 103, 104, 105, 181/106, 401; 33/178 F; 367/25, 911, 912; 166/250, 212, 65.1, 66, 206; 73/151

[56] References Cited

U.S. PATENT DOCUMENTS

| | | | |
|---|---|---|---|
| Re. 31,607 | 6/1984 | Vogel et al. .............. | 367/912 X |
| 3,376,950 | 4/1968 | Grine ...................... | 367/28 |
| 3,798,966 | 3/1974 | Planche ................... | 73/151 |
| 4,192,380 | 3/1980 | Smith ...................... | 166/250 |
| 4,394,754 | 7/1983 | Waters ..................... | 367/75 |
| 4,549,630 | 10/1985 | Brown ..................... | 181/106 |
| 4,614,250 | 9/1986 | Panetta et al. ............ | 181/102 |
| 4,648,478 | 3/1987 | Dedole et al. ............. | 181/106 |

FOREIGN PATENT DOCUMENTS

| | | |
|---|---|---|
| 0155462 | 9/1985 | European Pat. Off. . |
| 0157662 | 10/1985 | European Pat. Off. . |
| 3305189 | 8/1984 | Fed. Rep. of Germany . |
| 2501380 | 9/1982 | France . |

*Primary Examiner*—Deborah L. Kyle
*Assistant Examiner*—Brian S. Steinberger
*Attorney, Agent, or Firm*—Kerkam, Stowell, Kondracki & Clarke

[57] ABSTRACT

Seismic probe more particularly usable in an untubed shaft comprising a central body and arms opening out radially in different directions. The end of each of the arms is provided with means for anchoring the arm on the wall of the shaft and geophones in a box. In one embodiment, each of the arms can be moved outwardly from the central body independently of the other arms.

4 Claims, 5 Drawing Sheets

SEISMIC PROBE MORE PARTICULARLY USABLE IN AN UNTUBED DRILLING SHAFT

BACKGROUND OF THE INVENTION

The present invention relates to a seismic probe, more particularly for use in untubed drilling shafts or wells. After drilling a shaft, it is of interest to model the ground around the shaft in seismic wave velocities.

To illustrate the methods presently used for this purpose, FIG. 1 shows a section through the ground passing through the vertical axis of the drilling shaft. Into the latter, whose wall is designated 2, is lowered to different successive depths a seismic probe 4. The seismic wave is produced on the surface of the ground by firing an explosive or a seismic source 3.

A seismic probe generally comprises three main parts, namely a group of transducers, generally vertical and optionally horizontal geophones; an anchoring device making it possible to apply the probe body against the shaft well; and an electronic compartment for controlling the probe and transmitting the signals intercepted by the geophones.

In certain cases, it is advantageous to detect seismic waves moving substantially vertically and thus obtain a seismic profile of the land which is as vertical as possible. For this purpose it is necessary to have an effective anchoring or fixing of the transducers at each measuring point, in order to obtain a coupling of said transducers with the ground of an optimum nature and record all the seismic waves propagating in the ground without being disturbed by parasitic resonances.

The anchoring devices are conventionally constituted with the aid of a linear spring, an electric motor or a hydraulic jack raising one or two members 5 (cf FIG. 1), in such a way that they engage against the shaft wall the complete probe body containing the transducers.

However, the probes are largely designed to operate in a small diameter shaft (approximately 10 to 30 cm) and have a probe body sometimes more than two meters long. Therefore the shaft well must be regular at least over the length of the probe, so that the latter engages well against the wall and the geophones are well coupled with the ground.

This type of seismic probe is not very suitable for drilling shafts in an "open hole", i.e. untubed shafts, which generally have a variable diameter and numerous irregularities.

SUMMARY OF THE INVENTION

The invention is directed at a probe obviating the disadvantages of the prior art. It essentially has a central body provided with arms moving away radially in different directions and terminated by anchoring means and transducers. In the working position, the central body does not touch the walls of the drilling shaft. Contact with the shaft is solely ensured by the ends of the arms.

The anchoring or fixing means ensure a good coupling of the ends of the arms, and consequently the transducers located therein, with the shaft wall. The central body can be more easily disengaged from the transducers.

More specifically, the invention relates to a seismic probe comprising a central body, characterised in that it also comprise at least three arms which can be opened out in different directions about the central body, the end of said arms being provided with anchoring means and transducers, as well as means for opening out and engaging the ends of the arms with the wall of a drilling shaft.

Advantageously, the anchoring means comprise at least one point constituting simultaneously the receiving part of a transducer.

In preferred manner, there are five arms and they open out at approximately equal angular intervals.

In a preferred construction, each arm moves independently of the others by means of a jack, whose rod carries the anchoring means and transducers.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
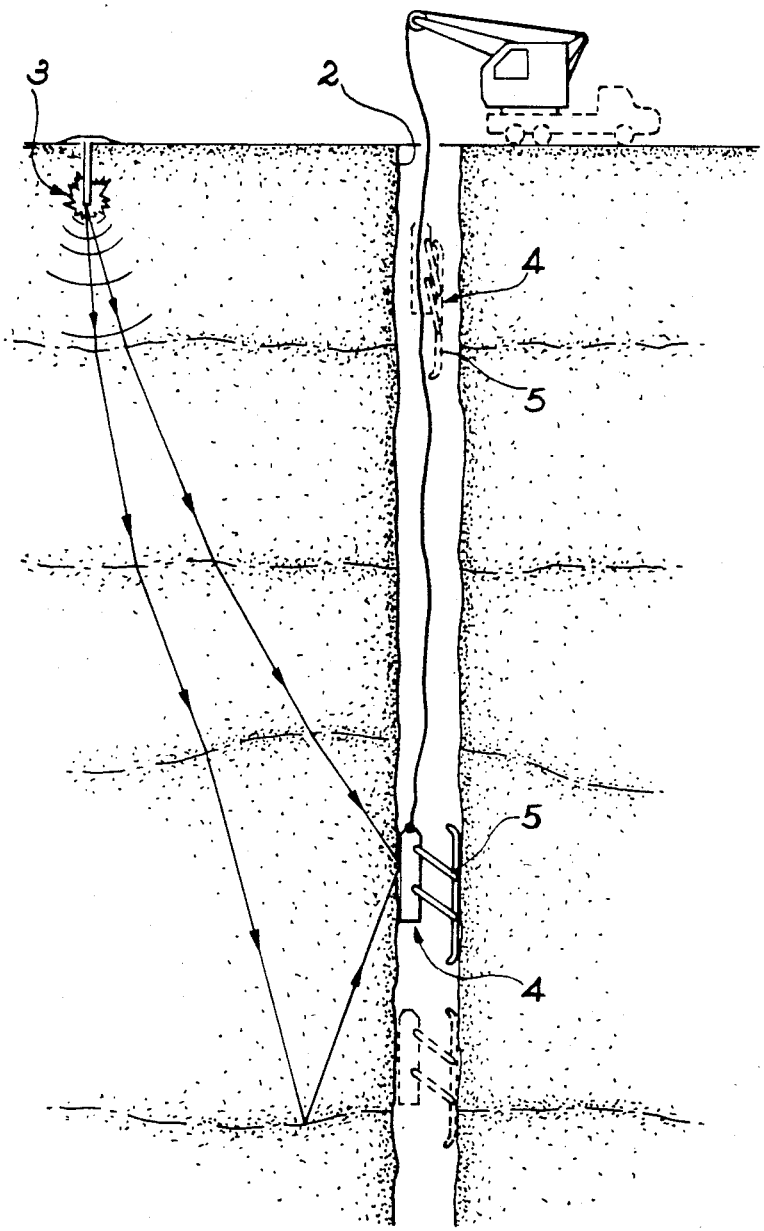
FIG. 1, already described, a section through the ground passing through the vertical axis of the drilling shaft.
Figure 2:
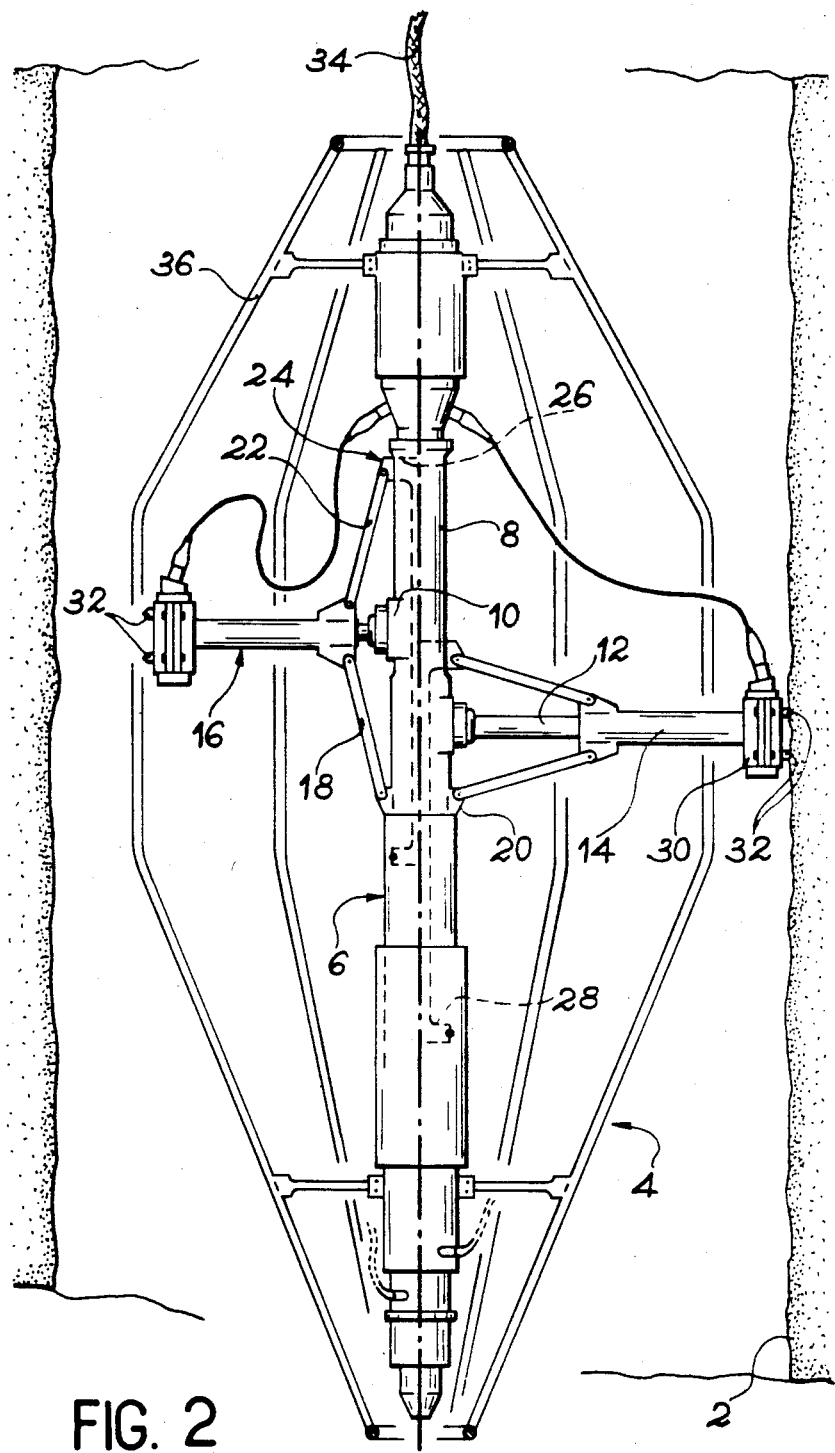
FIG. 2, a side view of the seismic probe according to a first embodiment of the invention, its fairing and the shaft being represented in longitudinal section, the left-hand half of the probe showing the telescopic arm in a folded back position and the right-hand half of the probe showing the telescopic arm in an opened out position.

A first embodiment of the probe according to the invention is shown in FIG. 2 and has a central body 6 containing an electronic part and a magnetic compass making it possible to check the orientation of the probe in the shaft. The probe also has a mechanical and hydraulic part which will now be described in greater detail.

A sliding tube 8 is formed in the central part of central body 6. A ring 10 is slidingly mounted on said sliding tube 8. For example 5 rods 12 are radially fixed to ring 10. A so-called support ring 14 is placed over each of the rods 12. The assembly formed by each rod and support tube pair constitutes an arm 16.

A first bar 18 is pivotably fixed on the end of each support tube 14 oriented towards ring 10 and on a fixed articulation 20 located at one end of sliding tube 8. A second bar 22 is pivotably fixed on said end of the support tube 14 and on a mobile articulation 24. The latter is constituted by the end of a jack rod 26 projecting radially from the sliding tube 8 through longitudinal openings machined in said tube. Jack rod 26 is able to slide within sliding tube 8 and is integral with a hydraulically operated piston 28.

When the piston 28 is actuated, the mobile articulation 24 performs a longitudinal movement, whilst bars 18, 22, ring 10, rods 12 and support tubes 14 cooperate in such a way that said tubes 14 perform a radial movement from a folded back position into an opened out position and vice-versa.

A transducer holding box 30 is fixed to the free end of each of the support tubes 14. Each box 30 is provided with at least one point 32, which can be anchored in the wall of the drilling shaft. When the probe is in the opened out position, each box 30 is engaged against the wall over its entire length, no matter what the irregularities thereof, coupling with the ground taking place through the points 32 in order to avoid parasitic resonances. Points 32 also prevent any sliding of the probe during measurements. Unlike in the case of conventional probes, the central body is consequently no longer in contact with the shaft wall 2.

Each box 30 is more particularly equipped with two series-connected vertical geophones or transducers, two horizontal geophones mounted in quadrature on a support coupled to the box and a proximity transducer. The latter makes it possible to check the satisfactory anchoring of each of the arms 16 and e.g. comprises a set of cupped washers separating each point 32 from a contact transducer. The latter supplies a signal when the washers are sufficiently crushed under the effect of a desired anchoring force.

The probe according to the invention is suspended by a cable 34 fixed to the upper end of central body 6. Advantageously cable 34 also transmits the control and measuring signals and to this end is of the conventional type, e.g. with seven conductors for diagraphy.

A protection cradle 36 fixed to the central body 6 protects the probe from shocks when the probe is manipulated in the shaft.

The probe according to the invention is used on the basis of the following principle. The probe is lowered into the shaft to a certain depth by playing out cable 34. When the probe is stabilized, arms 16 are opened until they have an adequate anchoring in the wall (the signal indicating good coupling with the ground being emitted by the contact transducers). Firing can then take place and the measurements can be made.

Arms 16 are then closed for lowering or raising the probe to a different desired depth.

In practical terms, bars 18, 12 are fixed to their articulation by saftey pins, which break when a certain force is applied thereto. It is also possible to raise the probe, even if an incident locks the telescopic arms 16 in the opened out position.

Figure 3:
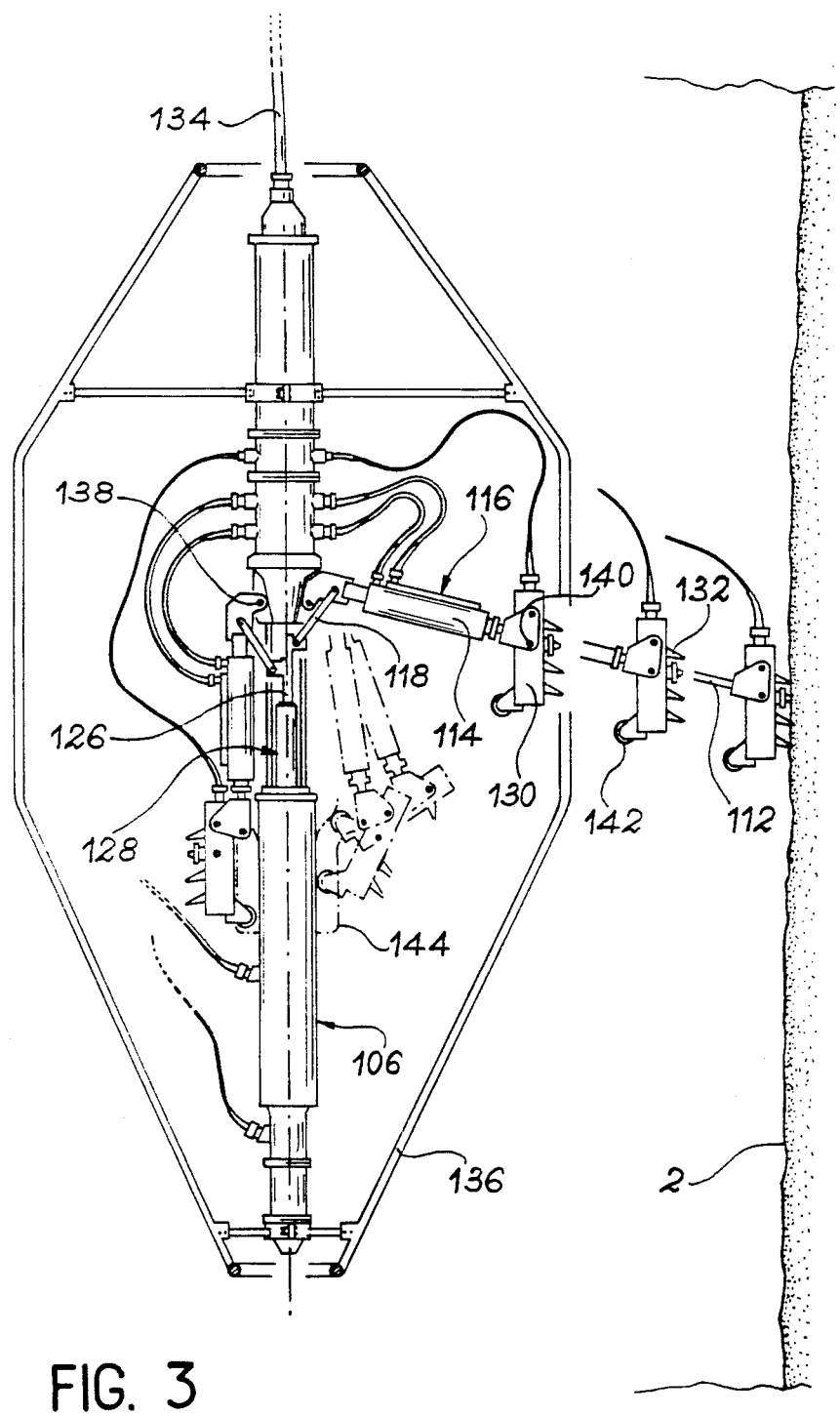
FIG. 3, a side view of the seismic probe according to a second embodiment of the invention, the left-hand half of the probe showing the telesopic arm in the rest position and the right-hand half of the probe showing said arm in the working position.

A second embodiment of the probe according to the invention is shown in FIG. 3 and it comprises a central body 106 containing an electronic part, a magnetic compass and a mechanical and hydraulic part which will now be described.

For example 5 arms 116 are in each case connected by an articulation 138 to central body 106. Each arm 116 is constituted by body 114 and rod 112 of a hydraulic jack.

One end of a link 118 is articulated to body 114 of each arm 116 in the vicinity of the corresponding articulation 138. The other end of link 118 is articulated to the end of rod 126 of a jack 128 located in central body 106.

Rod 126 of jack 128, links 118 and articulations 138 cooperate in such a way that arms 116 occupy a rest position for which they are substantially parallel to central body 106 when rod 126 is retracted and occupy a so-called working position in which the arms are substantially perpendicular to central body 106 when the rod 126 is extended.

The end of each arm 116, opposite to that articulated to the central body, is linked by an articulation 140 to a transducer holding box 130. The latter is provided with at least one point 132, which can be anchored in the drilling shaft wall.

The lower end of each box 130 is provided with a caster 142, which can be introduced in a chute 144 fixed to the central body in such a way that the box occupies a position substantially parallel to arm 116, when the latter is in the rest position and a position substantially perpendicular to the arm, when the latter is in the working position.

In the same way as the boxes 30 of FIG. 2, the transducer holding boxes 130 of FIG. 3 have geophones and a proximity transducer for checking the satisfactory anchoring of points 132.

A protection cradle 136 fixed to the central body protects the probe against any shocks, essentially when the arms are in the working, folded back position. The probe is suspended on a cable 134, e.g. of a conventional type with seven conductors, fixed to the upper end of central body 106.

The principle of using said probe will now be described. After lowering the probe to the desired depth and whereof the probe arms are in the rest and folded back position, jack 128 is actuated so that the arms come into the working position. At the same time, the transducer holding boxes are automatically correctly oriented. This is followed by the actuation of the jacks of arms 116 so that they occupy an opened out position until their anchoring in the wall is correct (the good anchoring or good coupling to the ground signal being emitted by the proximity transducers).

Firing can then take place and the measurements can be recorded.

This is followed by the actuation of the jacks of arms 116, so that they occupy a folded back position for raising or lowering the probe to another desired depth.

This embodiment of the probe makes it possible to have an independent opening out of each arm, which make it possible to ensure a good anchoring of the arms in shafts having very irregular walls. Moreover, this embodiment makes it possible to use such probe both in a small diameter drilling shaft (10 to 30 cm) and in a large diameter drilling shaft (approximately 2 meters).

Figure 4:
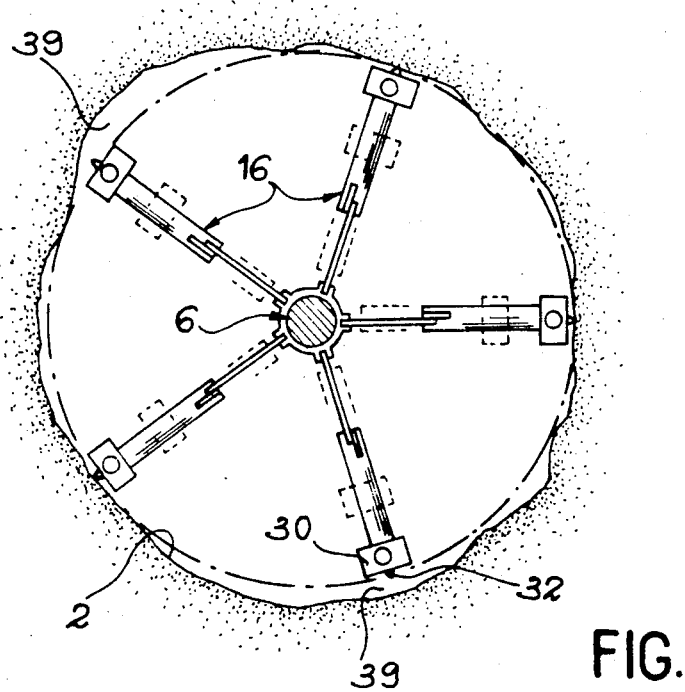
FIGS. 4 and 5, diagrammatically a plan view of the fixtures on the wall of the shaft realised by seismic probes of FIGS. 2 and 3 respectively.
Figure 5:
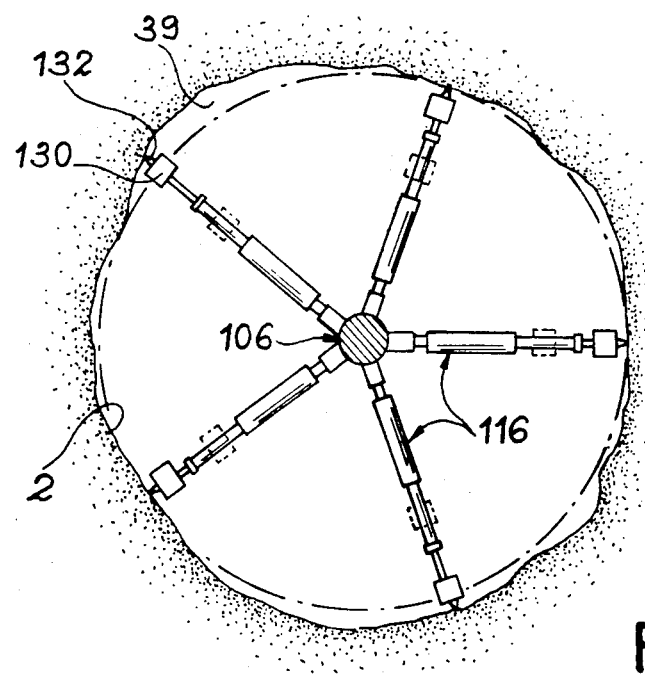

Thus, as show by FIGS. 4 and 5, the arm 16 of the first embodiment of the invention move in unison, so that when the shaft wall has roughnesses 39, the probe can be anchored in a satisfactory manner in the wall, whilst the points 32 of the arms oriented towards said roughnesses 39 still float in the shaft. Thus, the transducers located in these arms are unable to transmit information and account must be taken thereof during the subsequent exploitation of the measurements.

However, the second embodiment of the invention has arms 116 which can be opened out independently by means of hydraulic jacks. The arms 116 continue their opening out until anchored in the shaft wall. This, it is ensured that the transducers of the different arms 116 supply the same information at the time of the measurements, which can facilitate the exploitation thereof and reduce the relative errors. Therefore the second embodiment is preferred as compared with the first.

Figure 6:
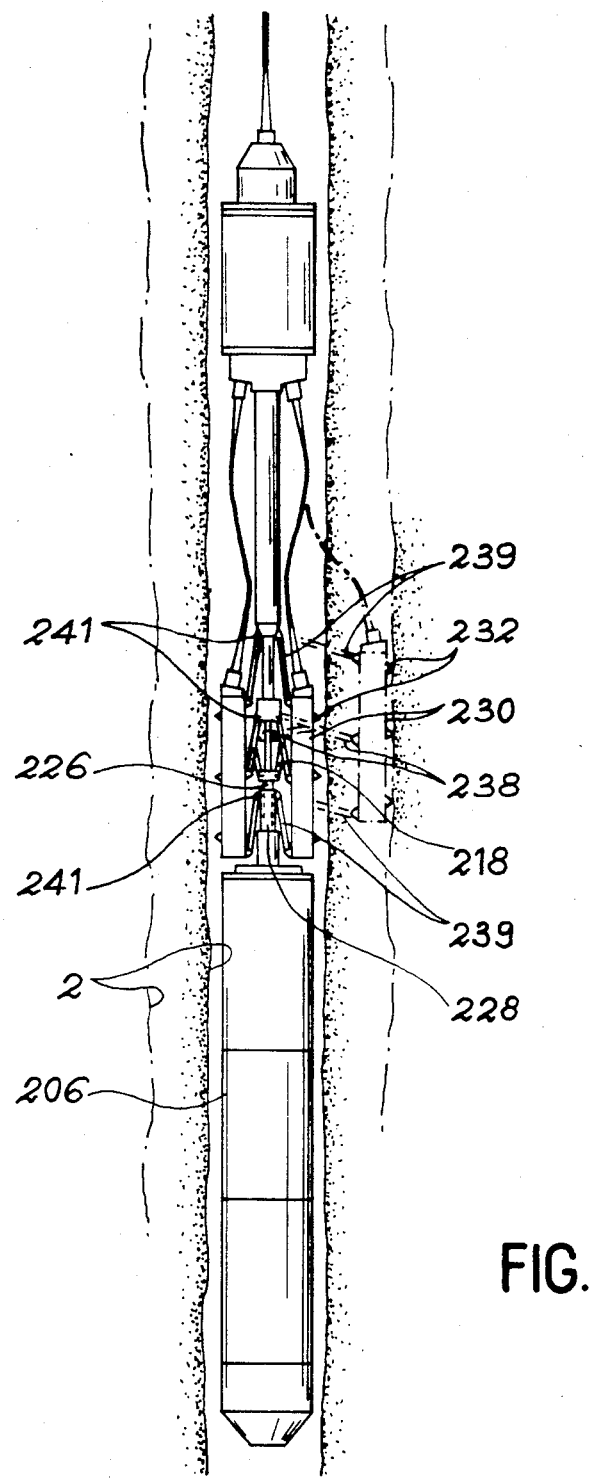
FIG. 6, a side view of a third embodiment of the invention.

A third embodiment of the invention is shown in FIG. 6 and applies to the small diameter drilling operations frequently encountered in the petroleum industry. The need to miniaturize the probe explains why use is again made here of a simple mechanism making it possible to open out the arms in unison.

In this embodiment, the transducer holding boxes 230, terminated by points 232 effecting the anchoring in the shaft wall 2, have a larger size than the rest of the probe. It is for this reason that the transducer holding box 230 is articulated on three arms 238, 239, which are also articulated at fixed points 241 of the central body 206 and one of the arms 238 is also centrally articulated to a bar 218, itself articulated to the end of the rod 226 of a jack 228. When rod 226 of jack 228 is raised, bar 218 opens out arm 239 and consequently brings points 232 into contact with the shaft wall 2.

Obviously the above description has only been given in an exemplified manner and modifications to the embodiments can be envisaged without modifying the fundamental principle of the invention.

Thus, consideration can be given to an electrical or pneumatic actuation of the arms. The number of arms is not limited. The electrical, electronic and hydraulic control and checking parts are adapted as a function of the chosen technical solutions.

What is claimed is:

1. A seismic probe comprising a central body, at least three arms which can be opened out in different directions about the central body, each arm having an end, each end being provided with anchoring means and a transducer, and means for opening the arms out and for engaging the ends of the arms against the wall of a drilling shaft, and wherein the means for opening out the arms and engaging the end thereof act independently for each arm, wherein each arm comprises a jack and a rod, the rods carrying the anchoring means and transducers, and wherein the anchoring means and transducers comprise a transducer holding box connected by an articulation to the end of the arm, and in which the jack pivots about an articulation fixed to the central body wherein the central body is provided with means ensuring that the transducer holding box occupies a position substantially parallel to the arm when the latter is in a rest position substantially parallel to the central body and a position which is substantially perpendicular to the arm when the latter is in a working position substantially perpendicular to the central body.

2. A seismic probe according to claim 1, wherein there are five arms and they open out at approximately equal angular intervals.

3. A seismic probe comprising a central body, at least three arms which can be opened out in different directions about the central body, each arm having an end, each end being provided with anchoring means and a transducer, and means for opening the arms out and for engaging the ends of the arms against the wall of a drilling shaft, and wherein each arm comprises, arranged on a common ring sliding along the central body, a rod fixed to the ring and extending perpendicular to the central body, a tube sliding along the rod, whereof one end remote from the central body carries the transducers and the anchoring means and wherein the arm opening out and engaging means comprise, for each arm, two bars articulated on the tube, one bar also being articulated to a fixed point of the central body, whilst the other bar is also articulated to an articulation which can move along the central body.

4. A seismic probe according to claim 3, wherein there are five arms and they open out at approximately equal angular intervals.

* * * * *